United States Patent
Kim et al.

(10) Patent No.: US 9,062,407 B2
(45) Date of Patent: Jun. 23, 2015

(54) WASHING MACHINE AND CONTROL METHOD THEREOF

(75) Inventors: Seung Hoon Kim, Suwon-si (KR); Sung Mo Lee, Gunpo-si (KR); Hyun Bae Kim, Yongin-si (KR); Satoru Matsumoto, Soongnam-si (KR); Sung Woo Her, Incheoni (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1079 days.

(21) Appl. No.: 13/088,692

(22) Filed: Apr. 18, 2011

(65) Prior Publication Data

US 2011/0252577 A1 Oct. 20, 2011

(30) Foreign Application Priority Data

Apr. 20, 2010 (KR) .................. 10 2010 0036411

(51) Int. Cl.
*D06F 33/02* (2006.01)
*D06F 35/00* (2006.01)
*D06F 37/20* (2006.01)

(52) U.S. Cl.
CPC ........ *D06F 37/203* (2013.01); *D06F 2204/065* (2013.01); *D06F 35/008* (2013.01); *D06F 2204/04* (2013.01); *Y02B 40/56* (2013.01)

(58) Field of Classification Search
CPC . D06F 34/008; D06F 37/203; D06F 2204/04; D06F 2204/065
USPC .................. 68/12.02, 12.06, 12.12, 12.23, 15
See application file for complete search history.

(56) References Cited

U.S. PATENT DOCUMENTS

| | | | | |
|---|---|---|---|---|
| 3,770,376 A * | 11/1973 | Sharpe | ............................... | 8/158 |
| 7,585,374 B2 * | 9/2009 | Sechelmann | .................... | 134/18 |
| 7,930,785 B2 * | 4/2011 | Cho et al. | ........................... | 8/158 |
| 8,108,959 B2 * | 2/2012 | Park | ............................... | 8/149.3 |
| 8,168,004 B2 * | 5/2012 | Lee et al. | ........................ | 134/18 |
| 2006/0151005 A1 * | 7/2006 | Kim et al. | ..................... | 134/22.1 |
| 2010/0000574 A1 * | 1/2010 | Lee et al. | ........................ | 134/18 |
| 2010/0065086 A1 * | 3/2010 | Cho | ................................ | 134/19 |

(Continued)

FOREIGN PATENT DOCUMENTS

| CN | 101512059 | 8/2009 |
|---|---|---|
| EP | 1 616 989 | 1/2006 |
| EP | 2 141 274 | 1/2010 |

(Continued)

OTHER PUBLICATIONS

Machine translation of JP 2007-319184, no date.*

(Continued)

*Primary Examiner* — Joseph L Perrin
(74) *Attorney, Agent, or Firm* — Staas & Halsey LLP (57) ABSTRACT

A washing machine and a control method thereof in which a tub washing course is safely performed using a sensor to measure vibration of a tub. Since whether or not laundry is present in s drum is sensed while performing the tub washing course, consumption of separate time, water, and energy to sense whether or not laundry is present is not required, and operation of the washing machine is controlled by diagnosing malfunction of the sensor. If plural sensors are installed, a micro-computer is connected to the plural sensors in common through a Serial Peripheral Interface (SPI) communication method or an Inter Integrated circuit (I2C) communication method, thereby reducing costs and volume of wire-harness.

6 Claims, 7 Drawing Sheets

(56) References Cited

U.S. PATENT DOCUMENTS

2010/0139011 A1* 6/2010 Kim et al. .................. 8/159
2012/0066928 A1* 3/2012 Son et al. .................. 34/427

FOREIGN PATENT DOCUMENTS

| JP | 4-117997 | 4/1992 |
| JP | 2007-318184 | 12/2007 |
| JP | 2007-319184 | 12/2007 |
| KR | 10-2001-0093968 | 10/2001 |

OTHER PUBLICATIONS

Partial European Search Report issued Oct. 22, 2013 in corresponding European Application No. 11153760.1.
Extended European Search Report issued Feb. 11, 2014 in corresponding European Application No. 11153760.1.
Chinese Office Action issued Jan. 13, 2015 in corresponding Chinese Patent Application No. 201110064874.X.

* cited by examiner

WASHING MACHINE AND CONTROL METHOD THEREOF

CROSS-REFERENCE TO RELATED APPLICATIONS

This application claims the benefit of Korean Patent Application No. 2010-0036411, filed on Apr. 20, 2010 in the Korean Intellectual Property Office, the disclosure of which is incorporated herein by reference.

BACKGROUND

1. Field

Embodiments relate to a washing machine which performs a tub cleaning course using a sensor to sense vibration of a tub, and a control method thereof.

2. Description of the Related Art

In general, a washing machine (usually, a drum washing machine) is an apparatus, which includes a tub to contain water (wash water or rinse water), a cylindrical drum rotatably installed to receive laundry, and a motor generating driving force to rotate the drum, and achieves washing of the laundry through tumbling of the laundry along the inner wall of the drum when the cylindrical drum is rotated.

Such a washing machine performs washing of laundry through a series of cycles, i.e., a washing cycle to remove contaminants from the laundry using water dissolving a detergent (concretely, wash water), a rinsing cycle to remove foams and residues of the detergent from the laundry using water not dissolving the detergent (concretely, rinse water), and a spin-drying cycle to dehydrate the laundry at a high speed. When the laundry is washed through this series of cycles, contaminants or lime scales are deposited on the rear surface of the drum as time goes by. The contaminants or the lime scales cause propagation of microorganisms (bacteria) throughout the tub, and further generate surface deposits (flock) causing decay, thereby bringing about generation of mold. The mold is a source of odor generation due to metabolic products thereof, or is attached to laundry while subsequent washing of laundry is performed, thus contaminating the laundry.

In order to solve this problem, a tub cleaning course, in which water is supplied to the washing machine, the supplied water is heated to a set sterilization temperature (a temperature to sterilize microorganisms) by a heater and simultaneously, the drum is agitated so as to sufficiently sterilize and wash the overall of the tub using hot water and steam, is carried out. In order to perform the tub cleaning course, whether or not laundry is present in the drum is sensed before or while the tub cleaning course is performed.

Therefore, the conventional washing machine proposes various methods to sense whether or not laundry is present in the drum.

In one example, a degree of inertia of the laundry in the drum is predicted. Whether or not laundry is present in the drum is sensed by accelerating the drum by applying a designated voltage to the motor and then predicting inertia using the voltage and the velocity variation of the motor during acceleration. This method in which whether or not laundry is present in the drum is sensed by predicting the degree of inertia of the laundry does not require an additional sensor and thus is advantageous in terms of material costs, but causes a high possibility in generating an error in sensing of the laundry according to voltages and generates a deviation according to washing machine models.

In another example, whether or not laundry is present in the drum is sensed using a vibration switch sensing vibration of the tub generated due to disposition of the laundry in the drum to one side. This method in which whether or not laundry is present in the drum is sensed using the vibration switch generates noise or vibration if unbalance of the laundry is generated due to rotation of the drum at a high speed, and, if it is severe, enables sensing as to whether or not laundry is present in the drum only when excessive vibration, such as set movement or frame touch, is generated, thereby being incapable of sensing whether or not laundry is present in the drum in real time.

Further, in order to sense whether or not laundry is present in the drum, sensing of the weight or the unbalance of the drum after water supply is required, thereby causing consumption of separate time, water, and energy.

SUMMARY

Therefore, it is an aspect to provide a washing machine and a control method thereof in which whether or not laundry is present in the washing machine is sensed in real time using a MEMS sensor to sense vibration of a tub without consumption of separate time, water, and energy.

It is another aspect to provide a washing machine and a control method thereof in which if at least one MEMS sensor is installed, a microcomputer and the at least one MEMS sensor are connected through a Serial Peripheral Interface (SPI) or Inter Integrated Circuit (I2C) communication method.

It is a further aspect to provide a washing machine and a control method thereof in which operation of the washing machine is controlled by diagnosing whether or not a MEMS sensor malfunctions.

Additional aspects will be set forth in part in the description which follows and, in part, will be apparent from the description, or may be learned by practice of the invention.

In accordance with one aspect, a control method of a washing machine, which has a tub, a heater and a drum installed in the tub, and a motor to rotate the drum, includes judging whether or not a tub washing course is selected, performing the tub washing course by operating the heater and the motor at set RPM and water temperature, if the tub washing course is selected, measuring displacement data according to vibration of the tub so as to sense whether or not laundry is present in the drum while performing the tub washing course, and comparing the measured vibration displacement data with a set limit value, and changing the set RPM and water temperature and performing the remaining tub washing course at the changed RPM and water temperature, if the vibration displacement data exceeds the limit value.

The performing of the remaining tub washing course at the changed RPM and water temperature may include stopping the operation of the motor, lowering the set RPM and water temperature so as to perform the tub washing course, and performing the remaining tub washing course at the lowered RPM and water temperature.

The control method may further include performing the remaining tub washing course at the set RPM and water temperature, if the vibration displacement data is less than the limit value.

The vibration displacement data of the tub may be measured until the tub washing course is completed so as to sense whether or not laundry is present in the drum in real time while performing the tub washing course.

The performing of the tub washing course may include supplying water up to a set water level of the tub, operating the heater so as to heat the supplied water to the set water temperature, and rotating the drum at the set RPM by operating the motor simultaneously with the operation of the heater.

The set water level may be a water level sufficient to submerge the lower end of the drum in the water.

The set RPM may be an RPM of the drum set to be higher than an RPM of the drum set during a washing or rinsing cycle.

In accordance with another aspect, a washing machine includes a tub containing water, a heater installed in the tub to heat the water, a drum installed in the tub to receive laundry, a motor to rotate the drum, and a control unit to perform a tub washing course by operating the heater and the motor at set RPM and water temperature, if the tub washing course is selected, to sense whether or not laundry is present in the drum while performing the tub washing course, and to change the set RPM and water temperature according to a result of the sensing.

The washing machine may further include a vibration sensor to measure displacement data according to vibration of the tub, and the control unit may compare the measured vibration displacement data with a set limit value, and lower the set RPM and water temperature and perform the remaining tub washing course at the lowered RPM and water temperature, if the vibration displacement data exceeds the limit value.

The control unit may perform the remaining tub washing course at the set RPM and water temperature, if the vibration displacement data is less than the limit value.

The control unit may measure the vibration displacement data of the tub until the tub washing course is completed so as to sense whether or not laundry is present in the drum in real time while performing the tub washing course.

The vibration sensor may be a sensor installed on the tub to restrict unbalanced vibration generated during high-speed rotation of the drum at the set RPM.

The vibration sensor may include any one selected from the group consisting of a MEMS sensor, an acceleration sensor, and an angular velocity sensor.

The MEMS sensor may measure displacement of the tub generated according to vibration of the tub.

In accordance with a further aspect, a washing machine includes a tub, at least one vibration sensor installed on the tub to measure vibration of the tub, and a control unit to diagnose malfunction of the at least one vibration sensor using data of the vibration sensor.

The at least one vibration sensor may be at least one MEMS sensor to measure displacement of the tub generated according to vibration of the tub.

The control unit may perform communication with the least one MEMS sensor in all sections of a cycle of the washing machine, judge that there is a defect in the communication, if data read in real time does not coincide with data initially written in a register of the least one MEMS sensor, and judge that the at least one MEMS sensor malfunctions, if the communication defect continues for a set time.

The control unit may check signal data of the at least one MEMS sensor whenever a washing cycle and a spin-drying cycle are started, and judge that the at least one MEMS sensor malfunctions, if the signal data is deviated from a regular range.

The control unit may judge that the at least one MEMS sensor malfunctions, if data are written in and read from a register of the at least one MEMS sensor during the cycle of the washing machine and if data written in the register and read data do not coincide with each other.

The control unit may reset power supplied to the at least one MEMS sensor whenever it is judged that the at least one MEMS sensor malfunctions.

A plurality of MEMS sensors may be installed on the tub.

The plurality of MEMS sensors may support a Serial Peripheral Interface (SPI) communication method and an Inter Integrated circuit (I2C) communication method.

The plurality of MEMS sensors may be respectively provided with signal lines for communication with the control unit, and the control unit may be connected to the signal lines of the plurality of MEMS sensors in common.

The control unit, in the case of the Serial Peripheral Interface (SPI) communication method, may set a first Chip Select (CS1) terminal and a second Chip Select (CS2) terminal using I/O ports, and connect the plurality of MEMS sensors to an SPI communication channel in common.

The control unit, in the case of the Inter Integrated circuit (I2C) communication method, may connect an SAO bit of a slave address of one of the plurality of MEMS sensors to a ground (GND) terminal so as to be set to '0', connect an SAO bit of a slave address of another of the plurality of MEMS sensors to a power (VCC) terminal so as to be set to '1', and connect the plurality of MEMS sensors to an I2C communication channel in common.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
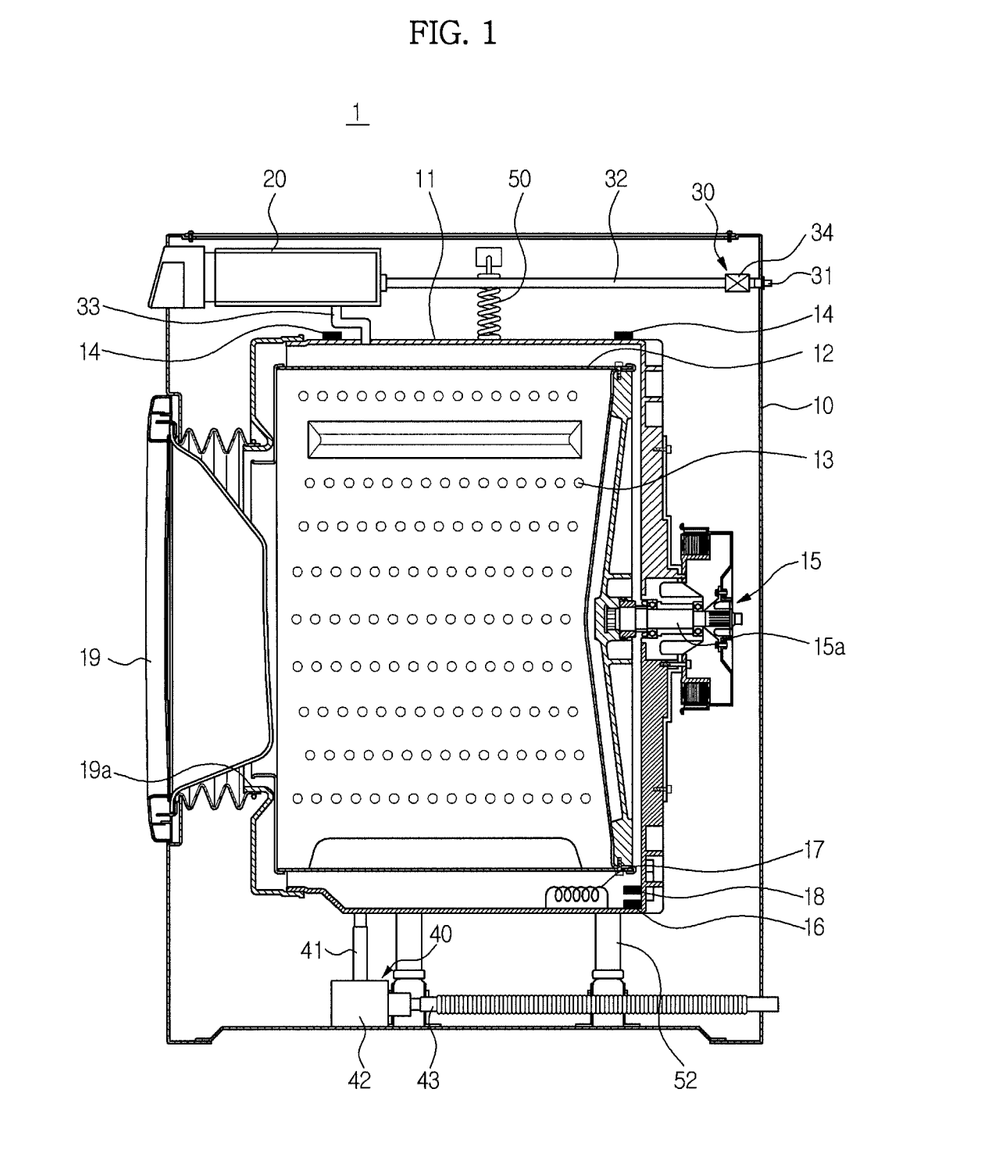
FIG. 1 is a longitudinal-sectional view of a washing machine in accordance with one embodiment.
Figure 2:
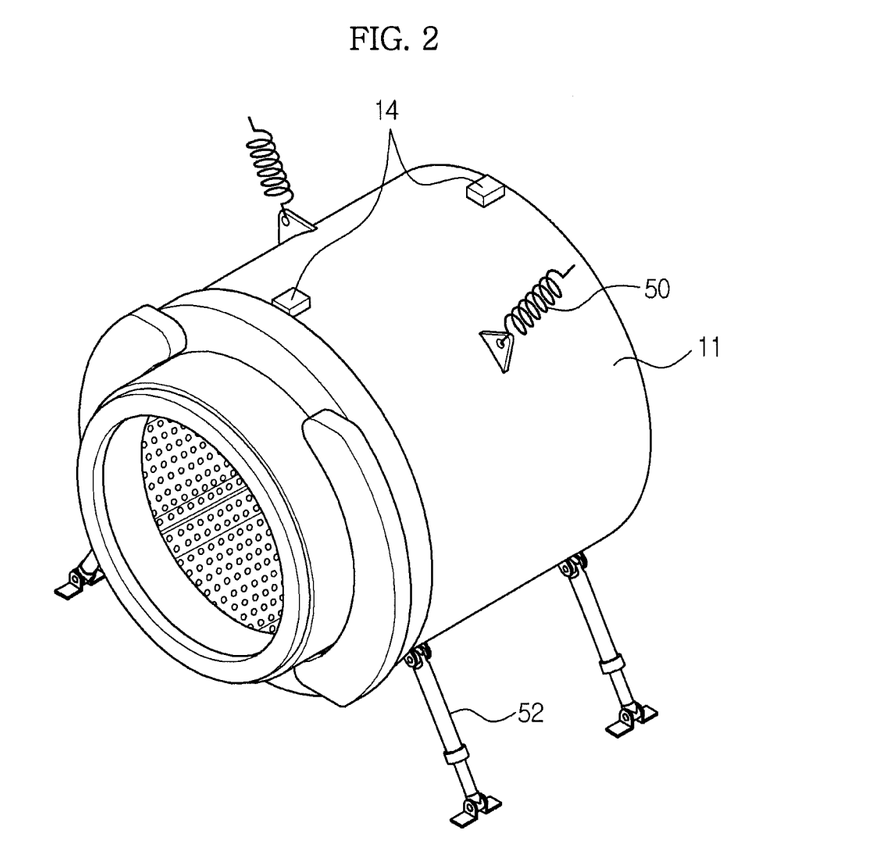
FIG. 2 is a perspective view illustrating installation of a vibration sensor applied to the embodiment.

FIG. 1 is a longitudinal-sectional view of a washing machine in accordance with one embodiment, and FIG. 2 is a perspective view illustrating installation of a vibration sensor applied to the embodiment.

As shown in FIGS. 1 and 2, a washing machine 1 in accordance with one embodiment includes a box-shaped main body 10 forming an external appearance of the washing machine 1, a cylindrical tub 11 installed in the main body 10 to contain water, and a cylindrical drum 12 rotatably installed in the tub 11 and provided with a plurality of holes 13.

At least one sensor (hereinafter, referred to as "vibration sensor") 14 to measure vibration of the tub 11 generated during an operating process of the washing machine 11 is installed on the upper surface of the tub 11. The vibration sensor 14 employs a Microelectromechanical System (hereinafter, referred to as "MEMS") sensor which measures displacement of the tub 11 according to vibration of the tub 11. MEMS sensors are divided into analog-type MEMS sensors and digital-type MEMS sensors, and a digital-type MEMS sensor is applied to the embodiment of the present invention. The digital-type MEMS sensor generally supports a Serial Peripheral Interface (SPI) communication method or an Inter Integrated circuit (I2C) communication method. Instead of the digital-type MEMS sensor, the vibration sensor 14 may employ a 3-axis acceleration sensor to measure vibration of the tub 11 in three directions (the directions of the X-axis, the direction of the Y-axis, and the direction of the Z-axis), or a gyro sensor which is a kind of angular velocity sensor.

A motor 15 serving as a driving device to rotate a rotary shaft 15a connected to the drum 12 so as to perform a washing cycle, a rinsing cycle, and a spin-drying cycle is installed at the outside of the rear surface of the tub 11. Further, a water level sensor 16 to sense a frequency varied according to a water level to sense an amount (level) of water in the tub 11, a washing heater 17 to heat the water in the tub 11, and a temperature sensor 18 to sense a temperature of the water in the tub 11 are installed within the lower portion of the tub 11.

A door 19 provided with an inlet 19a through which laundry is put into or taken out of the drum 12 is installed on the front surface of the main body 10.

A detergent supply device 20 to supply a detergent and a water supply device 30 to supply water are installed above the tub 11.

The inside of the detergent supply device 20 is divided into multiple spaces, and the detergent supply device 20 is installed on the front surface of the main body 10 such that a user may easily put the detergent or a fabric rinse into the respective spaces.

The water supply device 30 includes a first water supply pipe 32 connecting an external water supply pipe 31 and the detergent supply device 20 to supply water to the inside of the tub 11, a second water supply pipe 33 connecting the detergent supply device 20 and the tub 11, and a water supply valve 34 installed on the first water supply pipe 32 to control water supply. Such a configuration enables water supplied to the inside of the tub 11 to pass through the detergent supply device 20, thereby allowing the detergent within the detergent supply device 20 to be mixed with the water and thus the water containing the detergent to be supplied to the tub 11.

Further, in the washing machine 1 in accordance with the embodiment, a drain device 40 to drain water in the tub 11 is provided. The drain device 40 includes a first drain pipe 41 connected to the lower portion of the tub 11 to guide the water in the tub 11 to the outside of the main body 10, a drain pump 42 installed on the first drain pipe 41, and a second drain pipe 43 connected to an outlet side of the drain pump 42.

Further, in the washing machine 1 in accordance with the embodiment, in order to prevent vibration generated during the operating process of the washing machine 1, suspension springs 50 to elastically support the tub 11 at the upper portion of the tub 11 and dampers 52 to reduce vibration of the tub 11 at the lower portion of the tub 11 are provided.

The suspension springs 50 and the dampers 52 movably support the tub 11 respectively at the upper and lower portions of the tub 11. That is, when the tub 11 is excited by vibration exciting force generated due to rotation of the drum 12, the tub 11 is vibrated in all directions, namely, a forward and backward direction, a leftward and rightward direction, and an upward and downward direction. The vibration of the tub 11 is reduced by the suspension springs 50 and the dampers 52.

Figure 3:
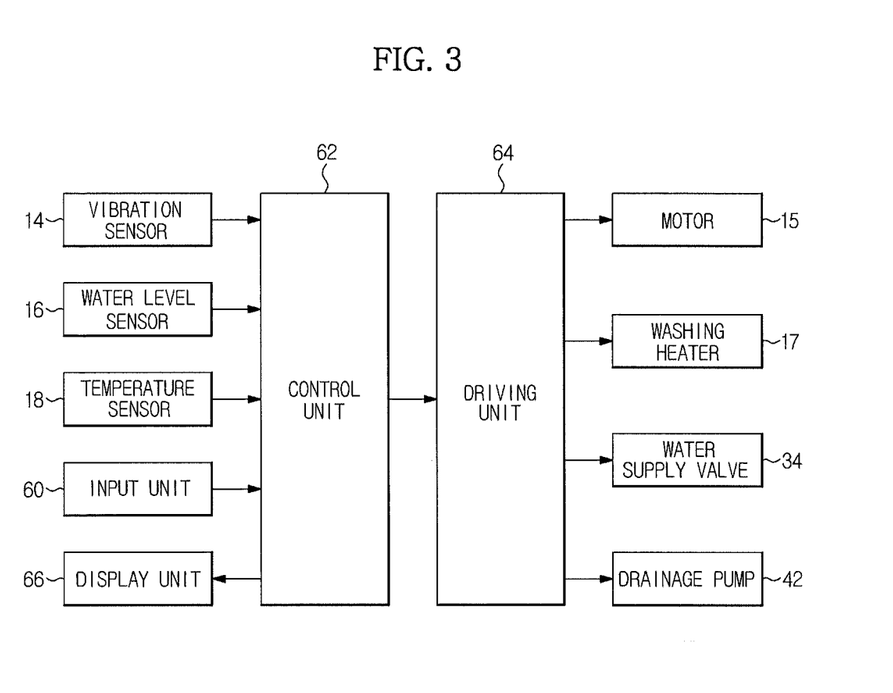
FIG. 3 is a control block diagram of the washing machine in accordance with the embodiment.

FIG. 3 is a control block diagram of the washing machine in accordance with the embodiment of the present invention. The washing machine 1 in accordance with the embodiment of the present invention further includes an input unit 60, a control unit 62, a driving unit 64, and a display unit 66.

The input unit 60 enables a user to input selected operation data so as to input a selected one out of a washing cycle, a rinsing cycle, and a spin-drying cycle, or a selected one out of a washing course and a tub cleaning course.

The tub cleaning course is an operating course to effectively clean the tub 11 and the drum 12. In order to remove contaminants or lime scales (hereinafter, referred to as foreign substances) deposited on the rear surface of the drum 12 and the inner surface of the tub 11, the tub cleaning course is carried out by supplying water to a set water level (a water level proper to remove the foreign substances; for example, a water level capable of submerging the lower end of the drum), heating the supplied water to a set sterilization temperature (a temperature capable of sterilizing microorganisms) through the washing heater 17 and simultaneously stirring the drum 12 through driving of the motor 15 so as to sterilize microorganisms in the tub 11 and the drum 12 by means of the water heated to the set sterilization temperature, and separating the foreign substances from the rear surface of the drum 12 and the inner surface of the tub 11 through high-speed rotation of the drum 12.

The control unit 62 is a microcomputer to control general operation of the washing machine 1, i.e., to control the washing, rinsing, and spin-drying cycles, according to the operation data input from the input unit 60. When the user selects the tub cleaning course, the control unit 62 performs the tub cleaning course of high-temperature and high-speed rotation so as to sufficiently sterilize and clean the tub 11 and the drum 12 to remove the foreign substances from the rear surface of the drum 12 and the inner surface of the tub 11.

The control unit 62 sets in advance a target RPM A1 of the drum 12 to perform the tub cleaning course (an RPM of the drum 12 to clean the tub 11 and the drum 12 by means of a swift water current, i.e., an RPM of the drum 12 set to be higher than an RPM of the drum 12 during the washing or rinsing cycle; about 150-250 RPM), and a target water temperature B1 (a water temperature to submerge foreign substances and to sterilize microorganisms through hot water and steam; about 70 degrees or more).

The control unit 62 receives displacement data according to vibration of the tub 11 (hereinafter, referred to as vibration displacement data) measured by the vibration sensor 14 installed on the tub 11 in order to restrict unbalanced vibration generated during high-speed rotation of the drum 12 at the target RPM A1 to perform the tub cleaning course.

Therefore, the control unit 62 receives the vibration displacement data measured by the vibration sensor 14, and compares the vibration displacement data with a predetermined limit value (displacement data to judge whether or not the unbalanced vibration occurs during the tub cleaning course; about 30 mm). As a result of the comparison, if the measured vibration displacement data is less than the limit value, the control unit 62 judges that laundry is not present in the drum 12 and then performs the tub cleaning course of high-temperature and high-speed rotation at the set target RPM A1 and target water temperature B1. On the other hand, if the measured vibration displacement data exceeds the limit value, the control unit 62 judges that laundry is present in the drum 12, stops the operation of the motor 15, lowers the set target RPM A1 and target water temperature B1, and then performs the remaining tub cleaning course through an algorithm changed using the lowered target RPM A2 (an RPM of the drum 12 during the washing or rinsing cycle; about 40-50 RPM) and the lowered target water temperature B2 (below about 40 degrees). The lowered target RPM A2 and the lowered target water temperature B2 are set to be an RPM of the drum 12 and a water temperature to assure a tub cleaning performance without damage to the laundry.

The driving unit 64 drives the motor 15, the washing heater 17, the water supply valve 34, and the drain pump 42 according to a drive control signal of the control unit 62.

The display unit 66 displays an operating state of the washing machine 1 according to a display control signal of the control unit 62.

Hereinafter, an operating process and effects of a washing machine and a control method thereof in accordance with one embodiment of the present invention will be described.

When the washing machine 1 is used for a long time, foreign substances (contaminants or lime scales) are deposited on the rear surface (in concrete, the outer surface) of the drum 12 and the inner surface of the tub 11 as time goes by. The foreign substances deposited on the rear surface of the drum 12 and the inner surface of the tub 11 encourage propagation of microorganisms (bacteria) throughout the tub 11 and the drum 12, and further generate surface deposits (flock) causing decay, thereby brining about generation of mold.

Therefore, the washing machine 1 in accordance with the embodiment of the is configured such that the tub cleaning course to remove the foreign substances from the rear surface of the drum 12 and the inner surface of the tub 11 and to sterilize microorganisms in the drum 12 and the tub 11 is performed.

The tub cleaning course is performed at a high temperature and a high speed so as to sufficiently sterilize and clean the tub 11 and the drum 12. When the tub cleaning course is performed under the condition that laundry is left in the drum 12 by user's mistake, the drum 12 is rotated at a high speed without sensing unbalance of the drum 12, and thus if unbalance of the laundry is generated, noise or vibration is caused, and if it is severe, set movement or frame touch is generated.

Therefore, in the conventional washing machine, whether or not laundry is present in the drum 12 is sensed before the tub cleaning course is performed. However, in order to sense whether or not laundry is present in the drum 12 before the tub cleaning course is performed, separate time, water, and energy are consumed.

On the other hand, in accordance with the embodiment, without consumption of separate time, water, and energy to sense whether or not laundry is present in the drum 12 before the tub cleaning course is performed, whether or not laundry is present in the drum 12 is sensed in real time while the tub cleaning course is performed, and simultaneously unbalanced vibration is limited so as to prevent set movement.

Figure 4:
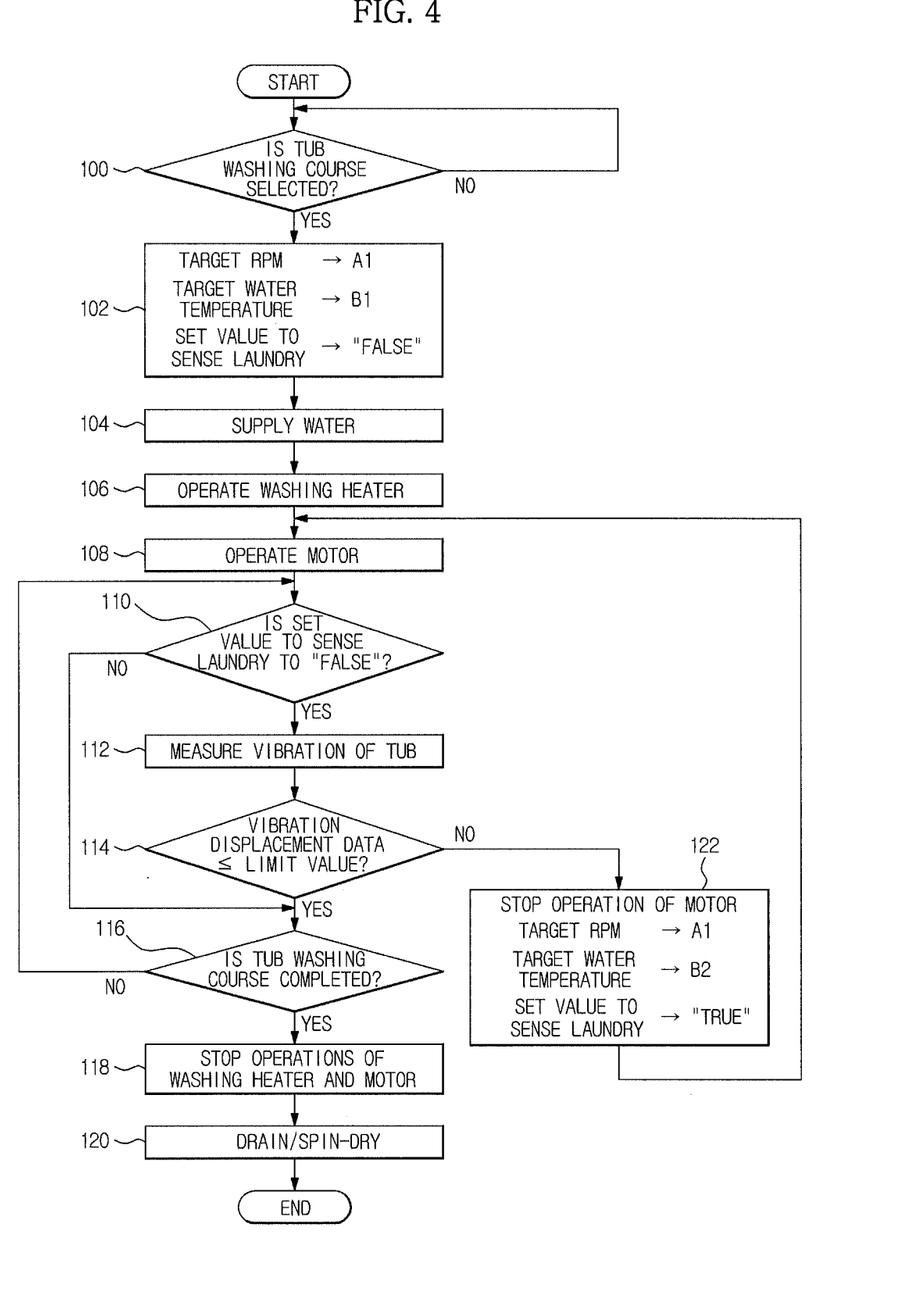
FIG. 4 is a flow chart illustrating a method of controlling a tub cleaning course in the washing machine in accordance with the embodiment.

FIG. 4 is a flow chart illustrating a method of controlling the tub cleaning course in the washing machine in accordance with the embodiment. That is, FIG. 4 illustrates an algorithm to assure a tub cleaning performance without damage to the laundry in the drum 12.

As shown in FIG. 4, when a user selects the tub cleaning course, course data selected by the user is input to the control unit 62 through the input unit 60.

Then, the control unit 62 judges whether or not the course selected by the user is the tub cleaning course according to the course data input from the input unit (operation 100).

As a result of the judgment of operation 100, if the course selected by the user is the tub cleaning course, the control unit 62 sets a target RPM A1 of the drum 12 to perform the tub cleaning course (an RPM of the drum 12 to clean the tub 11 and the drum 12 by means of a swift water current, i.e., an RPM of the drum 12 set to be higher than an RPM of the drum 12 during the washing or rinsing cycle; about 150-250 RPM), and a target water temperature B1 (a water temperature to submerge foreign substances and to sterilize microorganisms through hot water and steam; about 90 degrees). Further, the control unit 62 sets a value to sense whether or not laundry is present to "FALSE (laundry being absent)" (operation 102). The initially set value serves not to sense whether or not laundry is present before the tub cleaning course is performed, but serves to sense whether or not laundry is present in real time while the tub cleaning course is performed.

Thereafter, the control unit 62 operates the water supply valve 34 to supply water necessary to perform the tub cleaning course.

When the water supply valve 34 is operated, the water supply valve 34 is opened, and thus water supplied through the external water supply pipe 31 is supplied to the lower portion of the inside of the tub 11 (concretely, a space between the tub 11 and the drum 12) through the first water supply pipe 32, the detergent supply device 20, and the second water supply pipe 33 (operation 104).

Therefore, the control unit 62 senses a level of the water supplied to the tub 11 through the water level sensor 16, and, if the water level reaches a set water level (a water level proper to remove foreign substances; for example, a water level to submerge the lower end of the drum 12), stops the operation of the water supply valve 34 to stop water supply.

Thereafter, the control unit 62 operates the washing heater 17 to heat the supplied water (operation 106). The water in the tub 11 is heated by the operation of the washing heater 17.

Here, the control unit 62 operates the motor 15 together with the operation of the washing heater 17 so as to rapidly heat the water, and thus rotates the drum 12 at the target RPM A1 (operation 108). Here, the motor 15 is operated such that the drum 12 is rotated at a higher RPM (for example, 150-250 RPM) than an RPM (about 40-50 RPM) of the drum during the washing or rinsing cycle.

Thereby, the control unit 62 senses a temperature of the water supplied to the tub 11 through the temperature sensor 18, continuously operates the washing heater 17 until the sensed water temperature reaches the target water temperature B1, and controls the operation of the washing heater 17 to maintain the target water temperature B1 if the sensed water temperature reaches the target water temperature B1.

That is, the control unit 62 stops the operation of the washing heater 17 if the sensed water temperature exceeds the target water temperature B1, and operates the washing heater 17 if the sensed water temperature is less than the target water temperature B1. Thereby, the control unit 62 performs the tub washing course of high-temperature and high-speed rotation in which the drum 12 is rotated at the target RPM A1 while maintaining the target water temperature B1.

When the tub washing course is performed, microorganisms within the tub 11 and the drum 12 are sterilized by water heated to the target water temperature B1, and foreign substances deposited on the rear surface of the drum 12 and the inner surface of the tub 11 are separated from the drum 12 and the tub 11 by a swift water current generated due to the high-speed rotation of the drum 12. Thereby, the drum 12 and the tub 11 are washed.

In order to limit unbalanced vibration generated if laundry is present in the drum 12 while high-speed rotation of the drum 12 at the target RPM A1 to perform the tub washing course, the control unit 62 judges whether or not a set value to sense whether or not laundry is present is "FALSE (laundry being absent)" (operation 110).

As a result of the judgment of operation 110, if the set value to sense whether or not laundry is present is "FALSE", the vibration sensor 14 installed on the tub 11 to sense whether or not laundry is present in the drum 12 measures displacement data according to vibration of the tub 11 (hereinafter, referred to as vibration displacement data) generated while the tub washing course is performed, and inputs the vibration displacement data to the control unit 62 (operation 112).

Thereafter, the control unit 62 receives the vibration displacement data measured by the vibration sensor 14, and compares the vibration displacement data with a predetermined limit value (displacement data to judge whether or not the unbalanced vibration occurs during the tub cleaning course; about 30 mm) (operation 114).

As a result of the comparison of operation 114, if the measured vibration displacement data is less than the limit value, the control unit 62 judges that laundry is not present in the drum 12, and thus normally performs the tub washing course of high-temperature and high-speed rotation at the target RPM A1 and at the target water temperature B1, which have been initially set.

Thereafter, the control unit 62 judges whether or not the tub washing course is completed (operation 116). As a result of the judgment of operation 116, if the tub washing course is not completed, the control unit 62 is fed back to operation 110 and thus continuously performs the tub washing course of high-temperature and high-speed rotation.

On the other hand, as the result of the judgment of operation 116, if the tub washing course is completed, the control unit 62 stops the operations of the washing heater 17 and the motor 15 (operation 118), and drains water in the drum 12 and then performs the spin-drying cycle (operation 120).

Further, as the result of the comparison of operation 114, if the measured vibration displacement data exceeds the limit value, the control unit 62 judges that laundry is present in the drum 12, stops the operation of the motor 15, lowers the initially set target RPM A1 and target water temperature B1, and then performs the remaining tub cleaning course at the lowered target RPM A2 (an RPM of the drum 12 during the washing or rinsing cycle; about 40-50 RPM) and the lowered target water temperature B2 (below about 40 degrees). Then, the control unit 62 changes the set value to sense whether or not laundry is present to "TRUE (laundry being present)" (operation 122), is fed back to operation 108, and then continuously performs subsequent operations.

Further, as the result of the judgment of operation 110, if the set value to sense whether or not laundry is present is not "FALSE", the washing machine is in a state that it is already judged that laundry is present in the drum 12, and thus the remaining tub washing course is continuously performed at the lowered target RPM A2 and the lowered target water temperature B2, adjusted during operation 122.

Hereinafter, methods of diagnosing malfunction of the vibration sensor 14 to measure vibration of the tub 11 will be described with reference to FIG. 5.

The vibration sensor 14 is connected to the control unit 62 controlling the overall operations of the washing machine 1 through the Serial Peripheral Interface (SPI) communication method or the Inter Integrated circuit (I2C) communication method.

Figure 5:
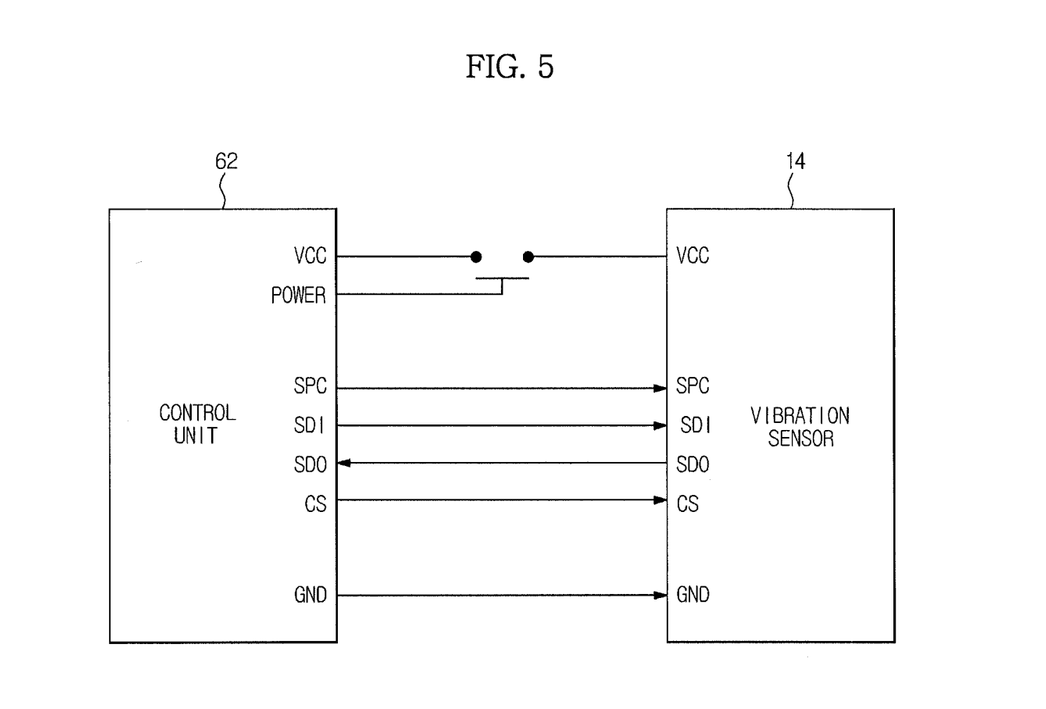
FIG. 5 is a block diagram illustrating communication and power connection between a vibration sensor and a control unit in accordance with one embodiment.

FIG. 5 is a block diagram illustrating communication and power connection between the vibration sensor and the control unit in accordance with one embodiment. FIG. 5 illustrates the vibration sensor 14 and the control unit 62 connected through the SPI communication method.

In FIG. 5, a power (VCC) terminal of the vibration sensor is connected to a power (VCC) terminal of the control unit 62, Serial Peripheral Clock (SPC), Serial Data Input (SDI), and Serial Data Output (SDO) terminals of the vibration sensor 14 are connected to an SPI communication channel (SPC, SDI, and SDO) of the control unit 62, a Chip Select (CS) terminal of the vibration sensor 14 is connected to a Chip Select (CS) terminal of the control unit 62, and a ground (GND) terminal of the vibration sensor 14 is connected to a ground (GND) terminal of the control unit 62.

The control unit 62 diagnoses whether or not the vibration sensor 14 malfunctions and controls operations of the washing machine 1 using data of the vibration sensor 14 measuring the vibration of the tub 11. There are various methods of diagnosing malfunction of the vibration sensor 14 according to operation regions of the washing machine 1.

First, a method of diagnosing malfunction of the vibration sensor 14, if the control unit 62 and the vibration sensor 14 are not communicated with each other continually for 5 seconds, will be described The control unit 62 performs communication with the vibration sensor 14 in all sections of the cycle of the washing machine 1. If data read in real time data initially written in a control register of the vibration sensor 14 do not coincide with each other, the control unit 62 judges that the communication is defective. When the communication is defective continually for 5 seconds, the control unit 62 diagnoses malfunction of the vibration sensor 14, and then stops the cycle of the washing machine 1.

If it is judged that the vibration sensor 14 malfunctions, the control unit 62 resets power supplied to the vibration sensor 14, and retries communication with the vibration sensor 14. When the control unit 62 succeeds in communication with the vibration sensor 14, the control 62 continuously performs the cycle of the washing machine 1.

Second, a method of diagnosing malfunction of the vibration sensor 14, if a self diagnosis mode of the vibration sensor 14 is not normally operated, will be described.

The vibration sensor 14 provides a function of the self diagnose mode of the vibration sensor 14. When the control register sets the self diagnose mode, the vibration sensor 14 itself generates a regular signal and thus provides data. If the data is deviated from a regular range proposed by a vibration sensor supplier (MEMS sensor supplier), it is judged that the vibration sensor 14 malfunctions.

The self diagnose mode of the vibration sensor 14 is performed whenever the washing cycle and spin-drying cycle are started. If it is judged that the vibration sensor 14 malfunctions, the control unit 62 resets power supplied to the vibration sensor 14, and again performs the self diagnose mode. If it is judged that the vibration sensor 14 malfunctions continually 10 times, the control unit 62 stops the cycle of the washing machine 1, and displays an error through the display unit 66.

Third, a method of diagnosing malfunction of the vibration sensor 14, if data do not coincide with each other when the data are written in and read from the control register of the vibration sensor 14, will be described.

The vibration sensor 14 includes the control register installed therein, and is operated in various modes according to data of the control register. The data of the control register may be changed during the cycle of the washing machine 1, as needed. Here, if data written in the control register and read data do not coincide with each other, it is judged that the vibration sensor 14 malfunctions.

If it is judged that the vibration sensor 14 malfunctions, the control unit 62 resets power supplied to the vibration sensor 14, and again performs writing/reading of data in/from the control register. If it is judged that the vibration sensor 14 malfunctions continually 10 times, the control unit 62 stops the cycle of the washing machine 1, and displays an error through the display unit 66.

As described above, whenever it is judged that the vibration sensor 14 malfunctions, the control unit 62 resets power supplied to the vibration sensor 14. Reset of power supplied to the vibration sensor 14 serves to initialize the vibration sensor 14.

Further, whenever a large vibration signal is sensed during the spin-drying cycle and thus spin-drying cycle is retried, power supplied to the vibration sensor 14 is reset. This serves to initialize the vibration sensor 14 because there is a possibility of making an error of the vibration sensor 14 due to introduction of external noise.

Hereinafter, if at least one vibration sensor to measure vibration of the tub 11 is installed, connection methods between the at least one vibration sensor 14 and the control unit 62 will be described with reference to FIGS. 6 and 7.

Figure 6:
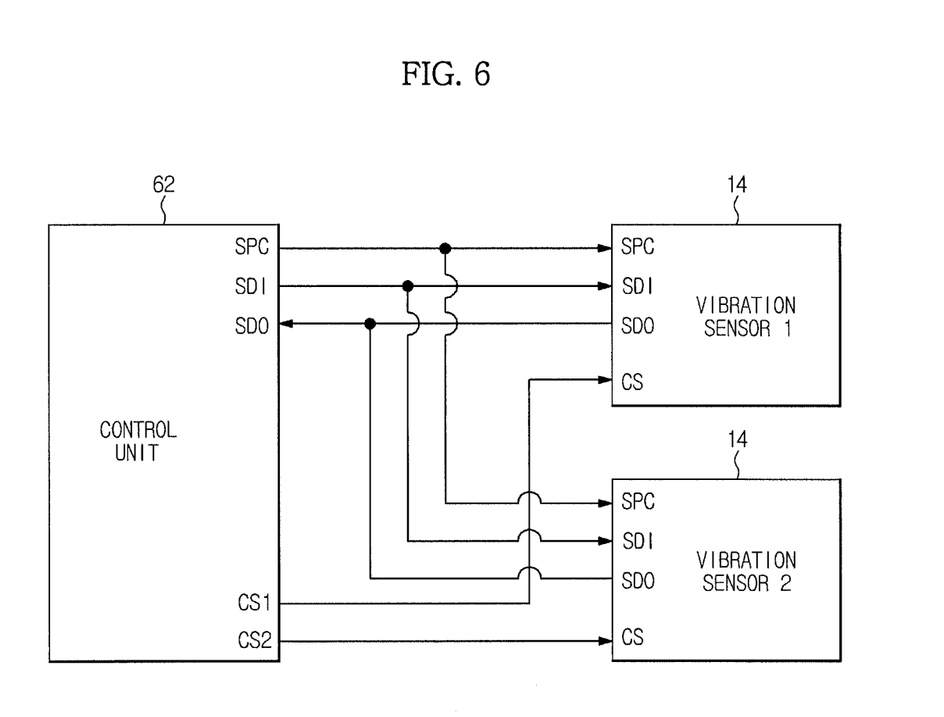
FIG. 6 is a block diagram illustrating communication and power connection between a plurality of vibration sensors and a control unit in accordance with another embodiment.

FIG. 6 is a block diagram illustrating communication and power connection between a plurality of vibration sensors and a control unit in accordance with another embodiment. FIG. 6 illustrates a connection state between one control unit 62 and plural (for example, two) vibration sensors (MEMS sensors) 14 using the SPI communication method.

An SPI communication protocol includes Chip Select (CS), Serial Peripheral Clock (SPC), Serial Data Input (SDI), and Serial Data Output (SDO) signal lines.

In order to control two vibration sensors 14, the control unit 62 sets a first Chip Select (CS1) terminal and a second Chip Select (CS2) terminal using I/O ports, and connects a Serial Peripheral Clock (SPC) terminal, a Serial Data Input (SDI) terminal, and a Serial Data Output (SDO) terminal to an SPI communication channel (SPC, SDI, and SDO) of the control unit 62 so as to be connected in common to the two vibration sensors 14.

As described above, the two vibration sensors 14 uses the Serial Peripheral Clock (SPC), Serial Data Input (SDI), and Serial Data Output (SDO) signal lines in common, thereby reducing costs and volume of wire-harness.

Figure 7:
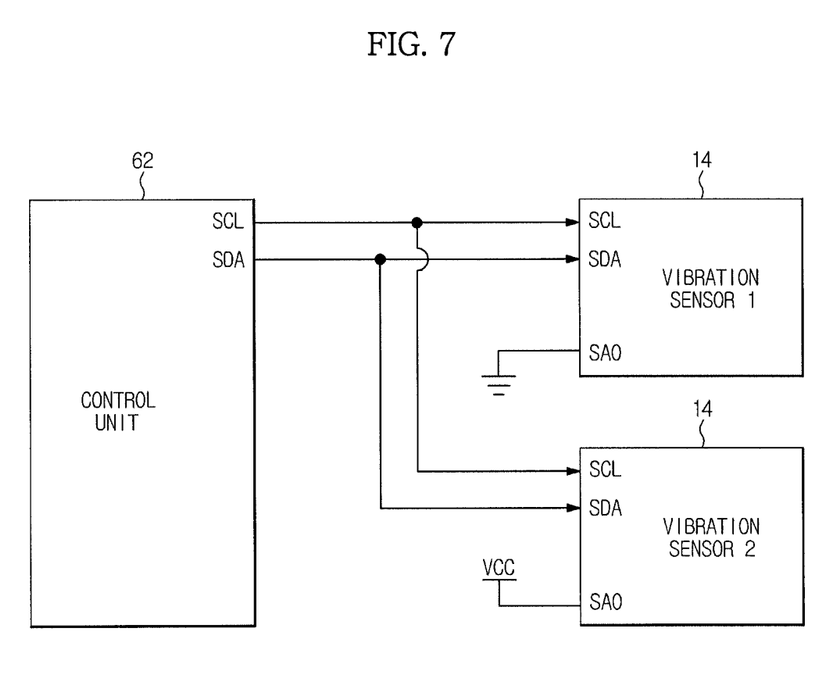
FIG. 7 is a block diagram illustrating communication and power connection between a plurality of vibration sensors and a control unit in accordance with a further embodiment.

FIG. 7 is a block diagram illustrating communication and power connection between a plurality of vibration sensors and a control unit in accordance with a further embodiment of the present invention. FIG. 7 illustrates a connection state between one control unit 62 and plural (for example, two) vibration sensors (MEMS sensors) 14 using the I2C communication method.

An I2C communication protocol includes Serial Clock Line (SCL: synchronous clock signal) and Serial Data Line (SDA: Address, Data, Acknowledge, Start & Stop) signal lines.

The I2C communication method connects two signal lines, i.e., the SCL and SDA signal lines, to plural devices (for example, vibration sensors) in common. Inherent slave addresses are respectively allocated to the plural devices, and only the device having the slave address called by the control unit 62 is operated.

In FIG. 7, an SAO bit of the slave address of one of the two vibration sensors 14 is connected to the ground (GND) terminal and thus is set to '0', and an SAO bit of the slave address of the other of the two vibration sensors 14 is connected to the power (VCC) terminal and thus is set to '1'. Further, the SCL and SDA signal lines connect the control unit 62 and the two vibration sensors 14 in common.

As described above, the control unit 62 and the two vibration sensors 14 are connected only by two signal lines, i.e., the SCL and SDA signal lines, thereby reducing costs and volume of wire-harness.

As is apparent from the above description, a washing machine in accordance with one embodiment senses whether or not laundry is present in a drum in real time while performing a tub washing course using a MEMS sensor measuring vibration of a tub, thus not requiring consumption of separate time, water, and energy to sense whether or not laundry is present in the drum. Further, the washing machine in accordance with the embodiment diagnoses malfunction of the MEMS sensor, thereby controlling overall operations of the washing machine.

Moreover, in the washing machine in accordance with the embodiment, if at least one MEMS sensor is installed, a microcomputer and the at least one MEMS sensor are connected in common through a Serial Peripheral Interface (SPI) communication method or an Inter Integrated circuit (I2C) communication method, thereby reducing costs and volume of wire-harness.

Although a few embodiments have been shown and described, it would be appreciated by those skilled in, the art that changes may be made in these embodiments without departing from the principles and spirit of the invention, the scope of which is defined in the claims and their equivalents.

What is claimed is:

1. A washing machine comprising:
   a tub containing water;
   a heater installed in the tub to heat the water;
   a drum installed in the tub to receive laundry;
   a motor to rotate the drum;
   a vibration sensor to measure displacement data according to vibration of the tub; and
   a control unit to perform a tub washing course by operating the heater and the motor at set RPM and water temperature, when the tub washing course is selected, to determine whether or not laundry is present in the drum while performing the tub washing course according to the measured displacement data from the vibration sensor, and to change the set RPM and water temperature according to a result of the sensing,
   wherein the control unit compares the measured vibration displacement data with a set limit value, and lowers the set RPM and water temperature and performs the remaining tub washing course at the lowered RPM and water temperature, when the vibration displacement data exceeds the limit value.

2. The washing machine according to claim 1, wherein the control unit performs the remaining tub washing course at the set RPM and water temperature, if the vibration displacement data is less than the limit value.

3. The washing machine according to claim 2, wherein the control unit measures the vibration displacement data of the tub until the tub washing course is completed so as to sense whether or not laundry is present in the drum in real time while performing the tub washing course.

4. The washing machine according to claim 1, wherein the vibration sensor is a sensor installed on the tub to restrict unbalanced vibration generated during high-speed rotation of the drum at the set RPM.

5. The washing machine according to claim 4, wherein the vibration sensor includes any one selected from the group consisting of a Microelectromechanical System (MEMS) sensor, an acceleration sensor, and an angular velocity sensor.

6. The washing machine according to claim 5, wherein the MEMS sensor measures displacement of the tub generated according to vibration of the tub.

* * * * *

UNITED STATES PATENT AND TRADEMARK OFFICE
CERTIFICATE OF CORRECTION

PATENT NO. : 9,062,407 B2  
APPLICATION NO. : 13/088692  
DATED : June 23, 2015  
INVENTOR(S) : Seung Hoon Kim et al.

Page 1 of 1

It is certified that error appears in the above-identified patent and that said Letters Patent is hereby corrected as shown below:

Title Page, First Column, (75) Inventors, Line 4

Delete "Soongnam-si" and insert --Seongnam-si--, therefor.

Title Page, First Column, (75) Inventors, Line 5

Delete "Incheoni" and insert --Incheon--, therefor.

Title Page, Second Column, (57) Abstract, Line 4

Delete "s drum" and insert --the drum--, therefor.

Signed and Sealed this
Twenty-seventh Day of October, 2015

Michelle K. Lee
*Director of the United States Patent and Trademark Office*